United States Patent
Soundararajan

(10) Patent No.: US 7,355,624 B2
(45) Date of Patent: Apr. 8, 2008

(54) METHOD AND APPARATUS FOR HAVING VIDEO IN A TWO-WAY RADIO

(75) Inventor: Aravind Soundararajan, Chennai (IN)

(73) Assignee: NXP B.V., Eindhoven (NL)

( * ) Notice: Subject to any disclaimer, the term of this patent is extended or adjusted under 35 U.S.C. 154(b) by 425 days.

(21) Appl. No.: 10/538,346

(22) PCT Filed: Dec. 12, 2003

(86) PCT No.: PCT/IB03/05932

§ 371 (c)(1),
(2), (4) Date: Jun. 10, 2005

(87) PCT Pub. No.: WO2004/056108

PCT Pub. Date: Jul. 1, 2004

(65) Prior Publication Data

US 2006/0112406 A1    May 25, 2006

Related U.S. Application Data

(60) Provisional application No. 60/433,745, filed on Dec. 16, 2002.

(51) Int. Cl.
*H04N 7/14* (2006.01)

(52) U.S. Cl. ............................... 348/14.13; 348/14.02
(58) Field of Classification Search ............. 348/14.02, 348/14.13
See application file for complete search history.

(56) References Cited

U.S. PATENT DOCUMENTS

| 6,658,264 B1* | 12/2003 | Irvin ..................... 455/552.1 |
| 6,693,510 B1* | 2/2004 | Yamaguchi .............. 348/14.02 |
| 6,825,873 B2* | 11/2004 | Nakamura et al. ....... 348/14.02 |
| 2001/0012051 A1* | 8/2001 | Hara et al. ............... 348/14.02 |
| 2003/0085990 A1* | 5/2003 | Saburi ..................... 348/14.02 |

FOREIGN PATENT DOCUMENTS

| DE | 198 29 855 A1 | 6/1999 |
| EP | 1 054 563 A1 | 11/2000 |
| WO | WO 00/79796 A1 | 12/2000 |

* cited by examiner

*Primary Examiner*—Stella Woo
(74) *Attorney, Agent, or Firm*—Peter Zawilski

(57) ABSTRACT

An apparatus and method for transmitting and receiving an audio signal and/or a video signal with a two-way radio. The two-way radio comprises a transmitter system and a receiver system. The transmitter system is adapted to transmit a digitized video signal and a digitized audio signal. The receiver system is adapted to receive a second digitized video signal and a second digitized audio signal.

25 Claims, 4 Drawing Sheets

METHOD AND APPARATUS FOR HAVING VIDEO IN A TWO-WAY RADIO

CROSS REFERENCE TO RELATED APPLICATION

This application claims the benefit of U.S. provisional application Ser. No. 60/433,745 filed Dec. 16, 2002, which is incorporated herein by reference.

The present invention relates to an apparatus and associated method to transmit and receive an audio signal and/or video signal with a two-way radio.

A two-way radio typically does not provide very much flexibility in the transmitting and receiving of data. Thus there is a need for a two-way radio to provide more flexibility in the transmitting and receiving of data.

The present invention provides a device, comprising:

a two-way radio comprising a transmitter system and a receiver system, wherein the transmitter system is adapted to transmit a first digitized video signal, wherein the transmitter system is adapted to transmit a first digitized audio signal, wherein the receiver system is adapted to receive a second digitized video signal, and wherein the receiver system is adapted to receive a second digitized audio signal.

The present invention provides a method, comprising:

providing a two-way radio comprising a transmitter system, wherein the transmitter system comprises a video input device, an audio input device, an analog to digital A/D converter block, an encoder block, a modulator, and a transmitter;

receiving and digitizing, by the A/D converter block, a video signal from the video input device and an audio signal from the audio input device;

digitally compressing, by the encoder block, the digitized audio signal, the digitized video signal, or both the digitized audio signal and the digitized video signal;

modulating, by the modulator, the digitally compressed audio signal, the digitally compressed video signal, or both the digitally compressed audio signal and the digitally compressed video signal so as to generate a digitally compressed modulate signal; and transmitting, by the transmitter, the digitally compressed modulated signal.

The present invention provides more flexibility for a two-way radio to transmit and receive data by having the two way radio transmit and receive both video data and audio data.

Figure 1:
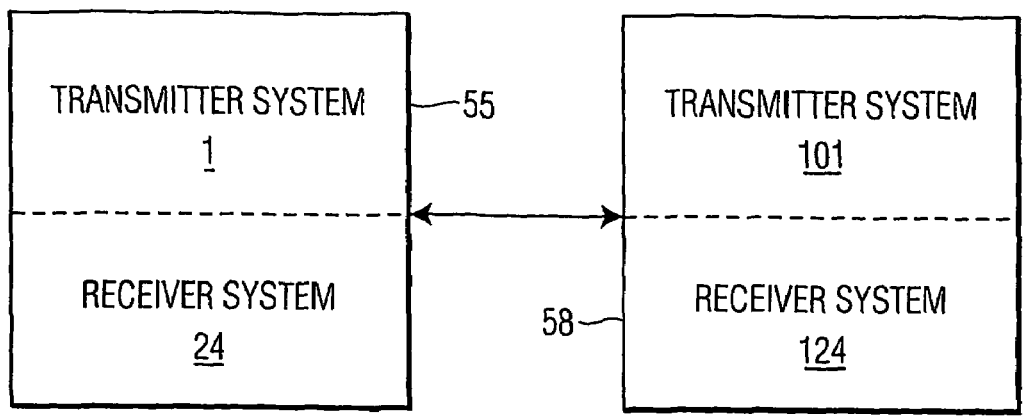
FIG. 1 depicts a block diagram view of a two-way radio in communication with a second two-way radio, in accordance with embodiments of the present invention.

FIG. 1 depicts a block diagram view of a two-way radio 55 comprising a transmitter system 1 and a receiver system 24 in communication with a second two-way radio 58 that is equivalent to the two-way radio 55, in accordance with embodiments of the present invention.

The second two-way radio 58 comprises a transmitter system 101 and a receiver system 124.

The transmitter system 1 (see FIG. 2 for detailed block diagram) is adapted to transmit an audio signal, a video signal or both the audio signal and the video signal together to the second two-way radio 58. The receiver system 24 (see FIG. 3 for detailed block diagram) is adapted to receive a second audio signal, a second video signal or both the second audio signal and the second video signal together from the second two radio 58. The two-way radios 55 and 58 may, inter alia, comprise walkie talkies with video capabilities.

Figure 2:
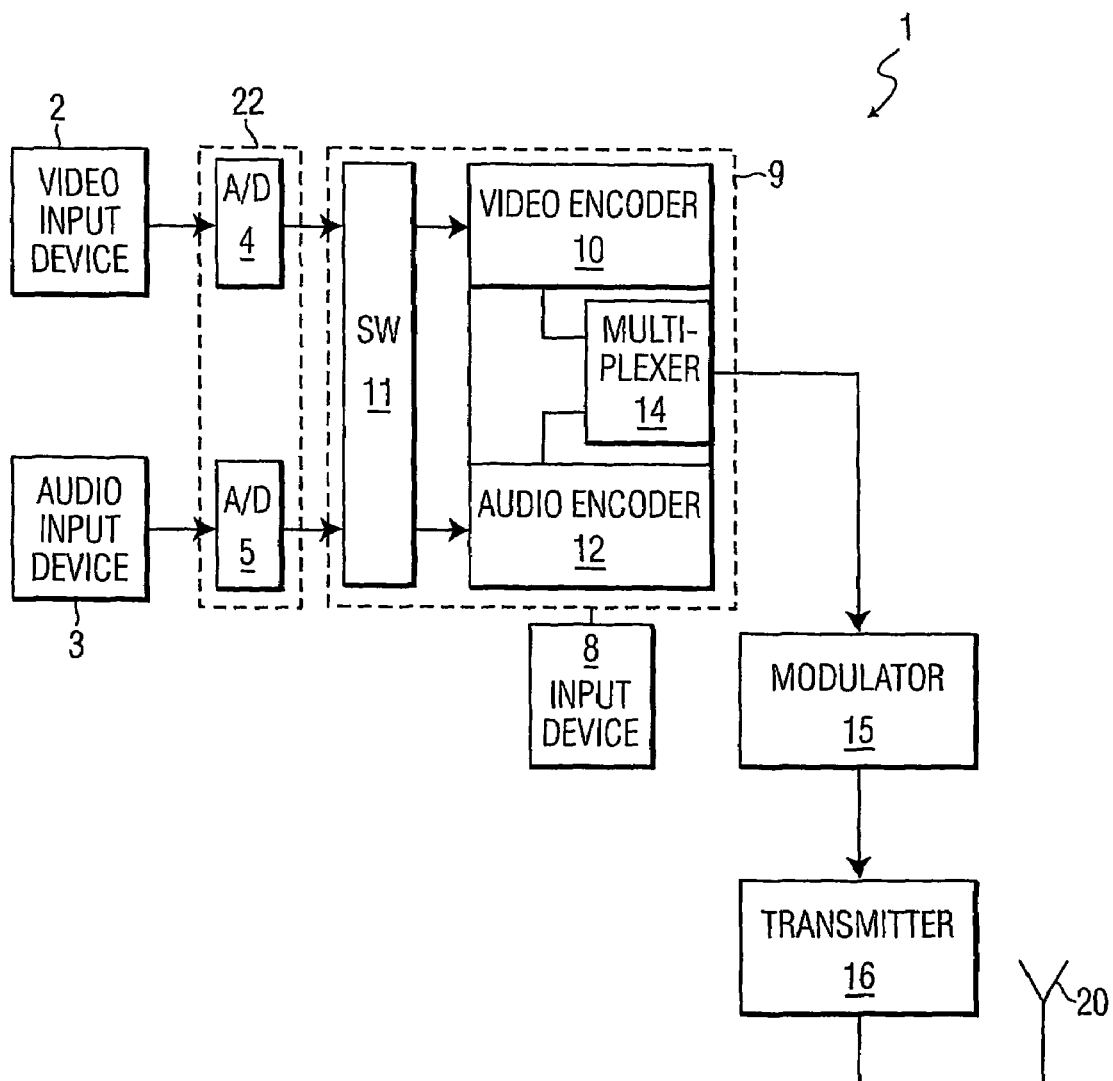
FIG. 2 illustrates a detailed block diagram view of a transmitter system in, in accordance with embodiments of the present invention.

FIG. 2 illustrates a detailed block diagram view of the transmitter system 1 in FIG. 1, in accordance with embodiments of the present invention. The transmitter system 1 comprises a video input device 2, an audio input device 3, an analog to digital A/D converter block 22, a command input device 8, an encoder block 9, a modulator 15, a transmitter 16, and an antenna 20. The video input device 2 may be any video input device known to a person of ordinary skill in the art such as, inter alia, a video camera. The video input device 2 is used to accept video data such as, inter alia, a video of a user. The audio input device 3 may be any audio input device known to a person of ordinary skill in the art such as, inter alia, a microphone. The audio input device 3 is used to accept audio data such as, inter alia, a voice of the user. The video input device 2 transmits the video data to an analog to digital (A/D) convertor block 22 comprising a video A/D convertor 4 to convert the video data to a digital video signal. The audio input device 3 transmits the audio data to the analog to digital A/D convertor block 22 comprising an audio A/D convertor 5 to convert the audio data to a digital audio signal. The encoder block 9 comprises a video encoder 10, an audio encoder 12, a switching means 11, and a multiplexer 14. The encoder block 9 may be a low bit rate encoder block. The switching means 11 is used to transmit the digitized audio signal from the audio A/D converter 5 to the audio encoder 12, the digitized video signal from the video A/D converter 4 to the video encoder 10, or both the digitized audio signal to the audio encoder 12 and the digitized video signal to the video encoder 10. The command input device 8 allows the user enter commands for control of the encoder block 9 such as, inter alia, signal(s) for encoding, bit rate, video resolution, etc. The command input device 8 may include any input device known to a person of ordinary skill in the art such as, inter alia, a keypad, a keyboard, etc. The encoder block 9 may comprise a hardware encoding block or a software encoder block. The hardware encoder block comprises all components within the encoder block 9 in dedicated hardware including: hardware encoders (video encoder 10, an audio encoder 12), a hardware switching means (switching means 11), and a hardware multiplexer (e.g., Integrated circuit (IC)). The hardware encoders may be any hardware encoders known to a person of ordinary skill in the art such as, inter alia, application specific integrated circuit (ASIC), etc. The hardware switching means may include any hardware switching means known to a person of ordinary skill in the art such as, inter alia, a hardware switch, a mechanical relay, a solid state relay, etc. The hardware switching means will physically connect or disconnect any digitized audio signals, any digitized video signals, or any combination thereof to/from their respective hardware encoders (audio encoder 5, video encoder 4) depending upon user specification resulting in a compression of only specified signals. Only the compressed signals will be transmitted to the second two-way radio 58 of FIG. 1. Alternatively, the software encoder block 9 comprises all components within the encoder block 9 as software blocks including: software encoders (video encoder 10, an audio encoder 12), a software switching means (switching means 11), and a software multiplexer (e.g., multiplexing algorithm). The software encoder block 9 enables a user to program features of encoding such as, inter alia, video resolution, bit rate, etc. Video resolution may comprise any format known to a person of ordinary skill in the art such as, inter alia, common interface format (CIF), quarter CIF, etc. The software encoders may be any software encoders known to a person of ordinary skill in the art such as, inter alia, a media processor (e.g., Nexperia® from Philips), a digital signal processor (DSP), etc. The software switching means will enable/disable audio or video encoding (in a software encoding application) depending upon user specification resulting in a compression of only specified signals. The software switching may be implemented using an algorithm. Hardware encoding or software encoding may use any compression standard known to a person of ordinary skill in the art such as, inter alia, Moving Pictures Experts Group-4 (MPEG-4) and H.263. Any signals that have been compressed are multiplexed by the multiplexer 14. The multiplexed signal is modulated by the modulator 15 and transmitted through the antenna 20 by the transmitter 16. The modulated signal may be transmitted over any service known to a person of ordinary skill in the art such as, inter alia, Family radio service (FRS), General Mobile Radio Service (GMRS), etc. The modulated signal may be transmitted in a bandwidth that is in, inter alia, a range of about 10 Kilobits/second (kbps) to about 20 kbps when transmitting the modulated signal over FRS and GMRS frequency bands. Higher bit rates may be achieved when the modulated signal is transmitted over a larger frequency band. The modulated signal is demodulated by the demodulator 32 and transmitted to the decoder block 34. The two way radio may comprise the capability to transmit the modulated signal over FRS and/or GMRS service. The frequency range FRS is shown by Table 1 below:

TABLE 1

| Channel | Frequency (MHZ) |
|---------|-----------------|
| 1       | 462.5625        |
| 2       | 462.5875        |
| 3       | 462.6125        |
| 4       | 462.6375        |
| 5       | 462.6625        |
| 6       | 462.6875        |
| 7       | 462.7125        |
| 8       | 467.5625        |
| 9       | 467.5875        |
| 10      | 467.6125        |
| 11      | 467.6375        |
| 12      | 467.6625        |
| 13      | 467.6875        |
| 14      | 467.7125        |

Table 1 shows a 25 KHZ separation between successive channels in each band (e.g., channels 1-7 in the 462 MHZ range, channels 8-14 in the 467 MHZ range). The modulated signal may be transmitted within this 25 KHZ separation. Alternatively, the modulated signal may be transmitted over multiple channels so that a higher bit rate stream is achieved. The bit rate stream for multiple channels may be in a range of, inter alia, about 5 Kbps to about 64 Kbps.

The frequency range for GMRS is shown by Table 2 below:

TABLE 2

| Channels | Frequencies |
|----------|-------------|
| 1        | 462.550     |
| 2        | 462.575     |
| 3        | 462.600     |
| 4        | 462.625     |
| 5        | 462.650     |
| 6        | 462.675     |
| 7        | 462.700     |
| 8        | 462.725     |
| 9        | 467.550     |
| 10       | 467.575     |
| 11       | 467.600     |
| 12       | 467.625     |
| 13       | 467.650     |
| 14       | 467.675     |
| 15       | 467.700     |
| 16       | 467.725     |

Chart 2 shows a 25 KHZ separation between successive channels in each band (e.g., channels 1-8 in the 462 MHZ range, channels 9-16 in the 467 MHZ range). The modulated signal may be transmitted within this 25 KHZ separation. Alternatively, the modulated signal may be transmitted over multiple channels so that a higher bit rate stream is achieved. The bit rate stream for multiple channels may be in a range of, inter alia, about 5 (Kbps) to about 64 Kbps.

Figure 3:
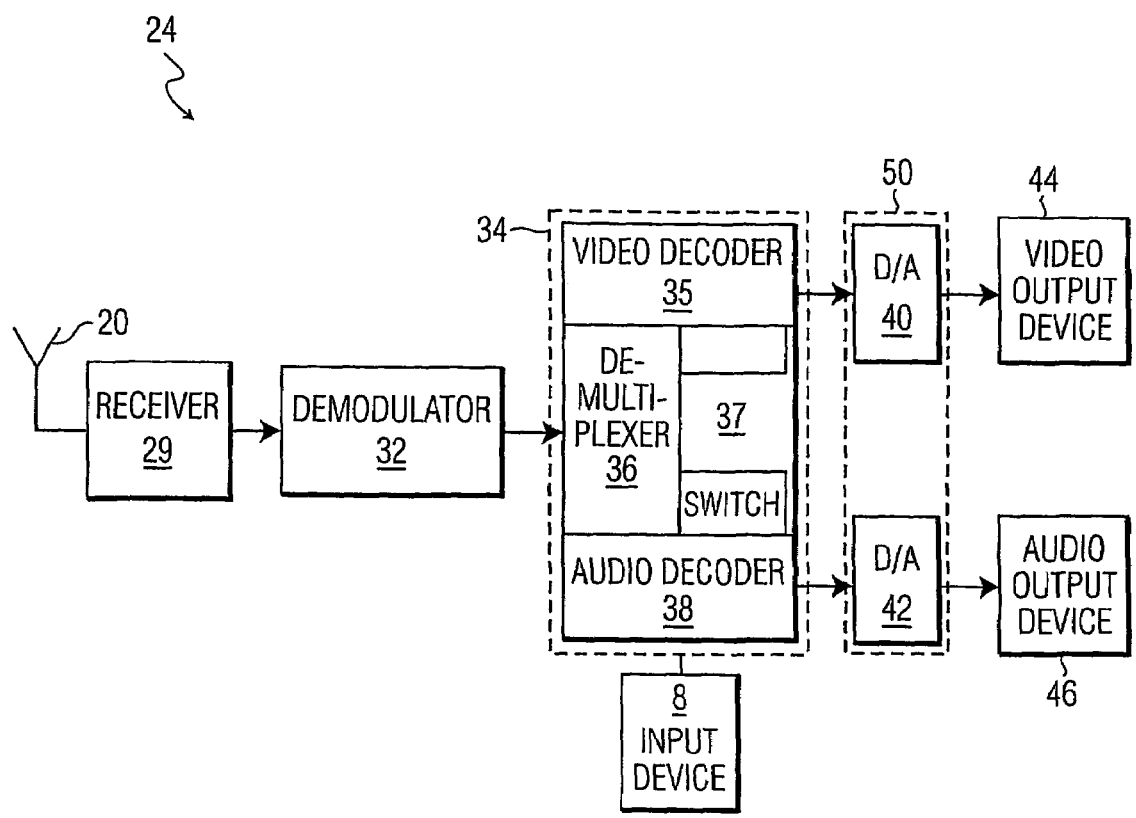
FIG. 3 illustrates a detailed block diagram view of a receiver system, in accordance with embodiments of the present invention.

FIG. 3 illustrates a detailed block diagram view of the receiver system 24 in FIG. 1, in accordance with embodiments of the present invention. The receiver system 24 comprises the antenna 20 of FIG. 2, a receiver 29, a demodulator 32, an decoder block 34, the command input device 8 of FIG. 2, an digital to analog (I/A) converter block 50, a video output device 44, and an audio output device 46. A modulated signal is received by the receiver 29 through the antenna 20 from another device such as the second two radio 58 of FIG. 1. The modulated signal may be received over any service known to a person of ordinary skill in the art such as, inter alia, Family radio service (FRS), General Mobile Radio Service (GMRS), etc. The modulated signal may be received in a bandwidth that is in a range of, inter alia, about 10 Kilobits/second (kbps) to about 20 Kbps when receiving the modulated signal over FRS and GMRS frequency bands. Higher bit rates may be achieved when the modulated signal is received over a larger frequency band. The modulated signal is demodulated by the demodulator 32 and transmitted to the decoder block 34. The two way radio may comprise the capability to receive the modulated signal over FRS and/or GMRS service. The frequency range for FRS is shown by Chart 1 in the FIG. 2 description and the frequency range for GMRS is shown by Chart 2 in the FIG. 2 description. Chart 1 (FRS) shows that there is a 25 KHZ separation between successive channels in each band (e.g., channels 1-7 in the 462 MHZ range, channels 8-14 in the 467 MHZ range). Additionally, chart 2 (GMRS) shows that there is a 25 KHZ separation between successive channels in each band (e.g., channels 1-8 in the 462 MHZ range, channels 9-16 in the 467 MHZ range). The modulated signal may be received within this 25 KHZ separation. Alternatively, the modulated signal may be received over multiple channels so that a higher bit rate stream is achieved. The bit rate stream for multiple channels may be in a range of, inter alia, about 5 Kbps to about 64 Kbps. The decoder block 34 comprises a video decoder 35, an audio decoder 38, a second switching means 37, and a demultiplexer 36. The decoder block 34 may be a low bit rate decoder block. The demultiplexer 36 receives the demodulated signal and demultiplexes the signal back into a compressed video signal and a compressed audio signal. The second switching means 37 is used to transmit the compressed audio signal to the audio decoder 38, the compressed video signal to the video decoder 35, or both the compressed audio signal to the audio decoder 38 and the compressed video signal to the video decoder 35. The command input device 8 allows the user enter commands for control of the decoder block 34 such as, inter alia, signal(s) for decoding, video resolution, etc. The command input device 8 may include any input device known to a person of ordinary skill in the art such as, inter alia, a keypad, a keyboard, etc. The decoder block 34 may comprise a hardware decoder block or a software decoder block. The hardware decoder block comprises all components within the decoder block 34 in dedicated hardware including: hardware decoders (video decoder 35, audio decoder 38), a second hardware switching means (switching means 37), and a hardware multiplexer (e.g., Integrated circuit (IC)). The hardware decoders may be any hardware decoders known to a person of ordinary skill in the art such as, inter alia, application specific integrated circuit (ASIC), etc. The hardware switching means may include any hardware switching means known to a person of ordinary skill in the art such as, inter alia, a hardware switch, a mechanical relay, a solid state relay, etc. The hardware switching means will physically connect or disconnect any compressed audio signals, any compressed video signals, or any combination thereof to/from their respective hardware decoders (audio decoder 38, video decoder 35) depending upon user specification resulting in a decompression of only specified signals. Only the decompressed signals will be transmitted to the D/A converter block 50 for processing. Alternatively, the software decoder block comprises all components within the decoder block 34 as software blocks including: software decoders (video decoder 34, audio decoder 38), a second software switching means (switching means 37), and a software multiplexer (e.g., multiplexing alogorithm). The software decoder block enables a user to program features of decoding such as, inter alia, video resolution, bit rate, etc. Video resolution may comprise any format known to a person of ordinary skill in the art such as, inter alia, common interface format (CIF), (QCIF), etc. The software decoders may be any software decoders known to a person of ordinary skill in the art such as, inter alia, a media processor (e.g., Nexperia® from Philips), a digital signal processor (DSP), etc. The second software switching means will enable/disable audio or video decoding (in a software decoding application) depending upon user specification resulting in a decompression of only specified signals. The software switching may be implemented using an algorithm such as the algorithm of FIG. 5. Hardware decoding or software decoding may use any decompression standard known to a person of ordinary skill in the art such as, inter alia, Moving Pictures Experts Group-4 (MPEG-4) and H.263. Any signals that have been decompressed are converted to analog signals by the D/A converter block 50 comprising a video D/A converter 40 and an audio D/A converter 42. An analog audio signal is transmitted to the audio output device 46 and an analog video signal is transmitted to the video output device 44. The video output device 44 may be any video output device known to a person of ordinary skill in the art such as, inter alia, a monitor. The monitor may be any monitor known to a person of ordinary skill in the art such as, inter alia, a liquid crystal display (LCD) monitor, a cathode-ray tube (CRT) monitor, a color monitor, a monochrome monitor, etc. The video output device 44 is used to accept video data such as, inter alia, video of a user. The audio output device 46 may be any audio output device known to a person of ordinary skill in the art such as, inter alia, an amplifier and a speaker, etc. The audio output device 46 is used to accept audio data such as, inter alia, a voice of the user.

Figure 4:
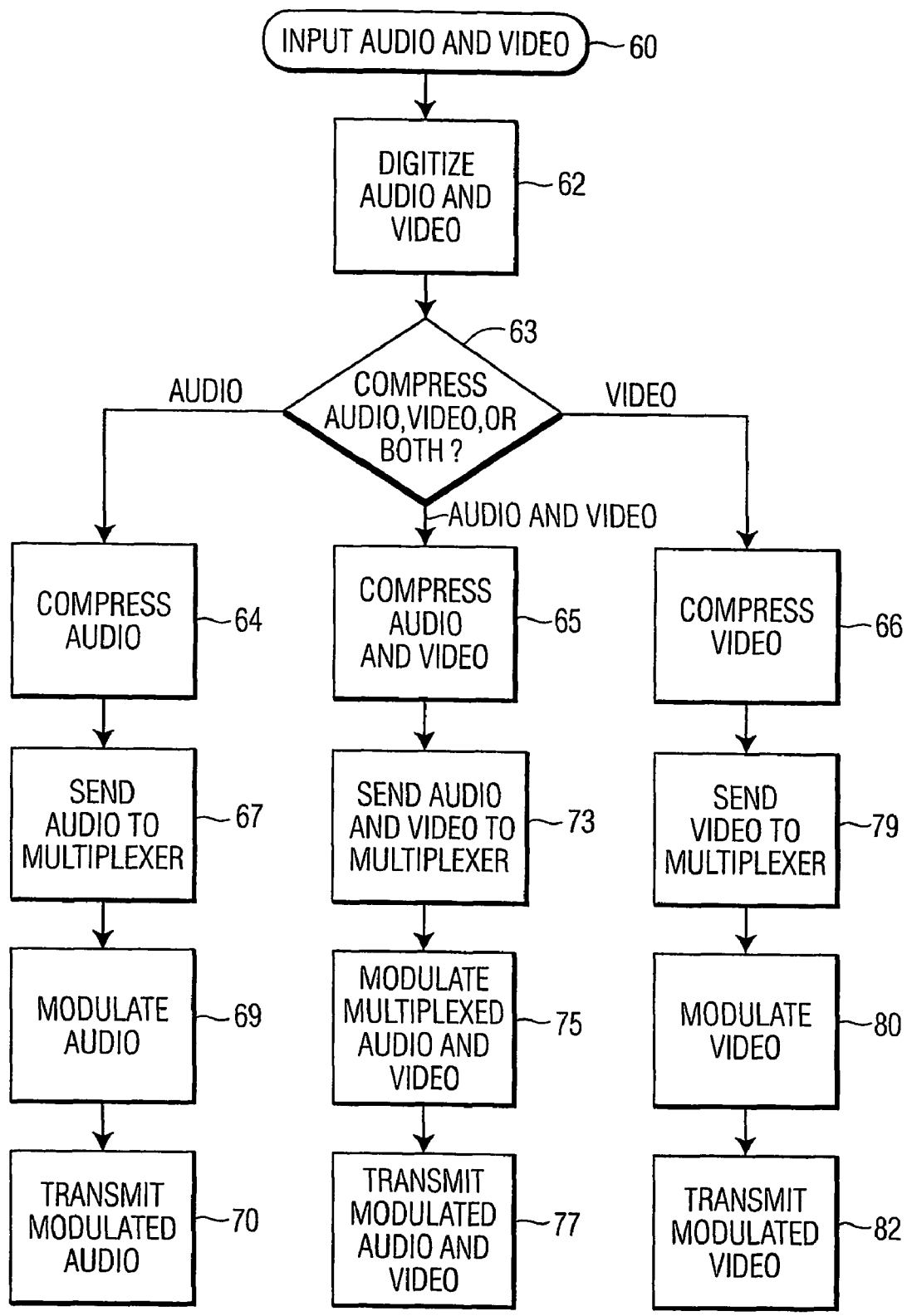
FIG. 4 illustrates a flowchart depicting an algorithm showing a process of the transmitter system in FIG. 2, in accordance with embodiments of the present invention.

FIG. 4 illustrates a flowchart depicting an algorithm showing a process of the transmitter system 1 in FIG. 2, in accordance with embodiments of the present invention. In step 60 a user inputs an audio signal (e.g., voice the user) and a video signal (e.g., video of the user). The audio signal and video signal are digitized in step 62. The user inputs a command through the command input device 8 (see FIG. 2) to compress the digitized audio signal, the digitized video signal or both the digitized audio signal and the digitized video signal in step 63. If the user chooses to compress just the digitized audio signal in step 63, the audio signal is compressed in step 64, multiplexed in step 67, modulated in step 69, and transmitted in step 70. If the user chooses to compress just the digitized video signal in step 63, the video signal is compressed in step 66, multiplexed in step 79, modulated in step 80, and transmitted in step 82. If the user chooses to compress both the digitized video signal the digitized video signal in step 63, the audio signal and the video signal are compressed in step 65, multiplexed in step 73, modulated in step 75, and transmitted in step 77.

Figure 5:
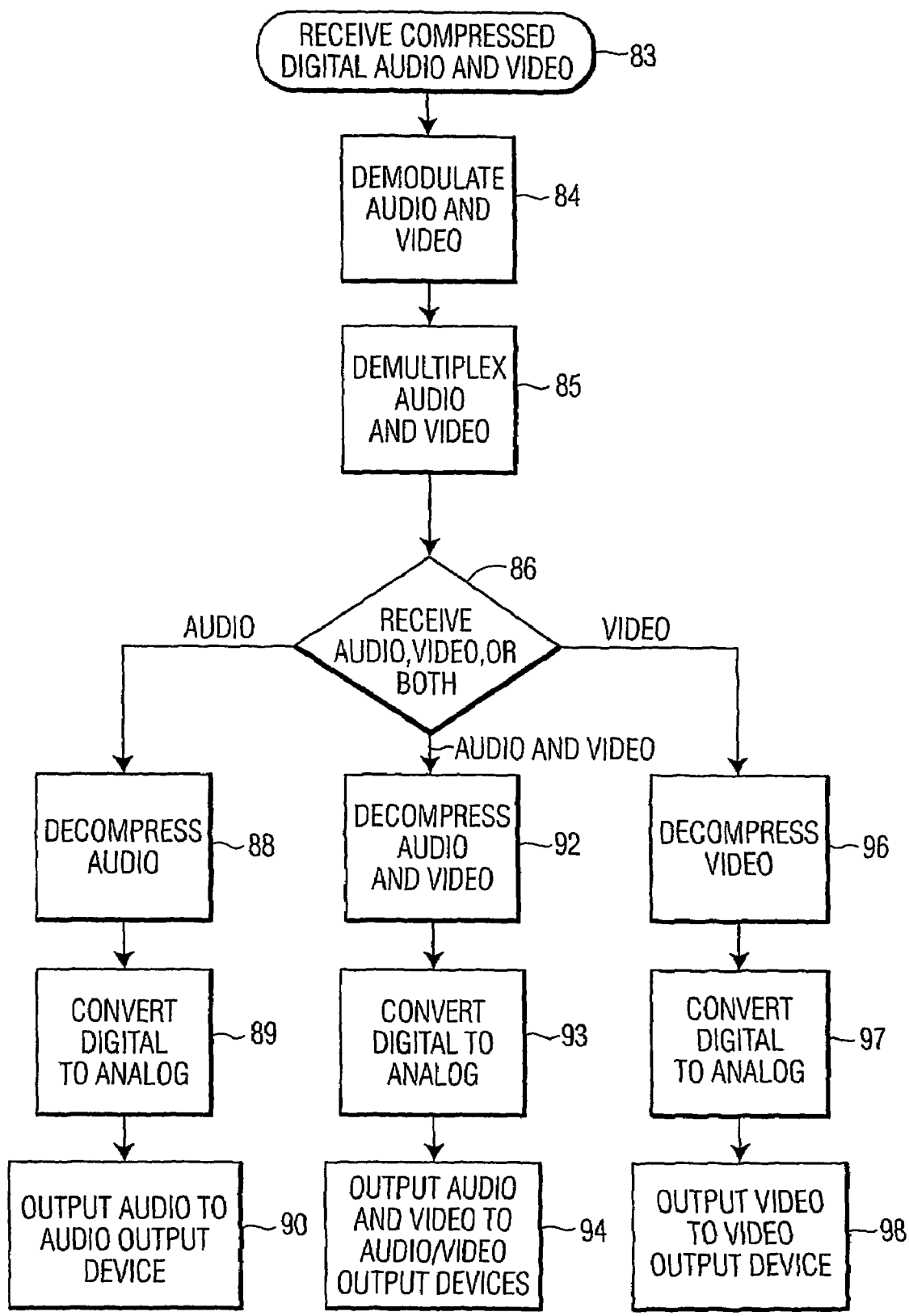
FIG. 5 illustrates a flowchart depicting an algorithm showing a process of the receiver system in FIG. 3, in accordance with embodiments of the present invention.

FIG. 5 illustrates a flowchart depicting an algorithm showing a process of the receiver system 24 in FIG. 3, in accordance with embodiments of the present invention. In step 83 a user receives a compressed audio signal (e.g., voice the user) and a compressed video signal (e.g., video of the user) from the second two-way radio of FIG. 1. The compressed audio signal and compressed video signal are demodulated in step 84 and demultiplexed in step 85. The user inputs a command through the command input device 8 see (FIG. 3) to receive the compressed audio signal, the compressed video signal or both the compressed audio signal and the compressed video signal in step 86. If the user chooses to receive just the compressed audio signal in step 86, the audio signal is decompressed in step 88, converted to an analog signal in step 89, and outputted to the audio output device 46 (FIG. 3) in step 90. If the user chooses to receive just the compressed video signal in step 86, the video signal is decompressed in step 96, converted to an analog signal in step 97, and outputted to the video output device 44 (FIG. 3) in step 98. If the user chooses to receive both the compressed video signal and the compressed audio in step 86, the video signal and audio signal are decompressed in step 92, converted to an analog signals in step 93, and outputted to the video output device 44 (FIG. 3) and audio output device 46 in step 94.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. A device, comprising:
a two-way radio comprising a transmitter system and a receiver system, wherein the transmitter system is adapted to transmit an outgoing digitized video signal, wherein the transmitter system is adapted to transmit an outgoing digitized audio signal, wherein the receiver system is adapted to receive an incoming digitized video signal, and wherein the receiver system is adapted to receive an incoming digitized audio signal, wherein the transmitter system comprises an encoder block adapted to compress an input digitized video signal, an input digitized audio signal, or both the input digitized video signal and the input digitized audio signal to produce the outgoing digitized video signal, the outgoing digitized audio signal, or both the outgoing digitized video signal and the outgoing digitized audio signal, the encoder block comprising:

a video encoder for compressing the input digitized video signal;

an audio encoder for compressing the input digitized audio signal;

a multiplexer coupled to the video encoder and the audio encoder to receive output signals of the video encoder and the audio encoder; and a first switching means including multiple inputs to receive one or both of the input digitized video signal and the input digitized audio signal, the first switching means including multiple outputs connected to the video encoder and the audio encoder to transmit one or both of the input digitized video signal and the input digitized audio signal to the video encoder and the audio encoder.

2. The device of claim 1, wherein the receiver system comprises a decoder block adapted to decompress the incoming digitized video signal, the incoming digitized audio signal, or both the incoming digitized video signal and the incoming digitized audio signal, the encoder block comprising:

a video decoder for decompressing the incoming video signal;

an audio decoder for decompressing the incoming audio signal;

a demultiplexer to demultiplex incoming signals into the incoming video signal and the incoming audio signal; and a second switching means including multiple inputs to receive one or both of the incoming digitized video signal and the incoming digitized audio signal from the demultiplexer, the first switching means including multiple outputs connected to the video decoder and the audio decoder to transmit one or both of the incoming digitized video signal and the incoming digitized audio signal to the video decoder and the audio decoder.

3. The device of claim 1, wherein the encoder block comprises a hardware encoder block.

4. The device of claim 1, wherein the encoder block comprises a software encoder block.

5. The device of claim 1, wherein the transmitter system further comprises a video input device for accepting a video signal, an audio input device for accepting an audio signal, an analog to digital (A/D) convertor block for digitizing the video signal and the audio signal, a modulator for modulating at least one of the digitized video and audio signals so as to generate at least one modulated signal, a transmitter for transmitting the at least one modulated signal, and an antenna coupled to the transmitter, and wherein the receiver system comprises a receiver coupled to the antenna for receiving a second modulated signal, a demodulator for demodulating the second modulated signal, a digital to analog (D/A) convertor block for converting the incoming digitized video signal into an analog video signal and the incoming digitized audio signal into an analog audio signal, a video output device for displaying the analog video signal, and an audio output device for outputting the analog audio signal.

6. The device of claim 5, wherein the video input device comprises a video camera, and wherein the video output device comprises a monitor.

7. The device of claim 6, wherein the monitor is selected from the group consisting of a liquid crystal display (LCD) monitor and a cathode-ray tube (CRT) monitor.

8. The device of claim 6, wherein the monitor is selected from the group consisting of a color monitor and a monochrome monitor.

9. The device of claim 1, wherein the two-way radio is adapted to transmit and receive audio and video signals over a service selected from the group consisting of Family Radio Service (FRS) and General Mobile Radio Service (GMRS).

10. The device of claim 1, wherein the input digitized video signal and the input digitized audio signal are both digitally compressed using a digital compression standard selected from the group consisting of Moving Pictures Experts Group-4 (MPEG-4) and H.263, and wherein the incoming digitized video signal and the incoming digitized audio signal are both digitally decompressed using a digital decompression standard selected from the group consisting of MPEG-4 and H.263.

11. The device of claim 10, wherein the digitally compressed video signal and the digitally compressed audio signal are both transmitted in a bandwidth that is in a range of about 10 Kilobits per second (Kbps) to about 20 Kbps.

12. A method, comprising:

providing a two-way radio comprising a transmitter system, wherein the transmitter system comprises a video input device, an audio input device, an analog to digital A/D converter block, an encoder block, a modulator, and a transmitter;

receiving and digitizing, by the A/D converter block, a video signal from the video input device and an audio signal from the audio input device;

digitally compressing, by the encoder block, the digitized audio signal, the digitized video signal, or both the digitized audio signal and the digitized video signal;

modulating, by the modulator, the digitally compressed audio signal, the digitally compressed video signal, or both the digitally compressed audio signal and the digitally compressed video signal so as to generate a digitally compressed modulated signal; and transmitting, by the transmitter, the digitally compressed modulated signal, wherein the encoder block comprises a video encoder, an audio encoder, and a multiplexer coupled to the video encoder and the audio encoder, wherein the video encoder digitally compresses the video signal, and wherein the audio encoder digitally compresses the audio signal, the method further comprising:

switching by a switching means for switching the digitized audio signal to the audio encoder, the digitized video signal to the video encoder, or both the digitized audio signal to the audio encoder and the digitized video signal to the video encoder, the switching means including multiple inputs to receive one or both of the digitized video signal and the digitized audio signal from the A/D converter block, the switching means including multiple outputs connected to the video encoder and the audio encoder to transmit one or both of the digitized video signal and the digitized audio signal to the video encoder and the audio encoder.

13. The method of claim 12, wherein the encoder block comprises a hardware encoder block.

14. The method of claim 12, wherein the encoder block comprises a software encoder block.

15. The method of claim 12, wherein the video input device comprises a video camera.

16. The method of claim 12, further comprising transmitting the digitally compressed modulated signal over a service selected from the group consisting of Family Radio Service (FRS) and General Mobile Radio Service (GMRS).

17. The method of claim 12, wherein digitally compressing the digitized audio signal and the digitized video signal uses a digital compression standard selected from the group consisting of Moving Pictures Experts Group-4 (MPEG-4).

18. The method of claim 12, further comprising transmitting the digitally compressed modulated signal in a bandwidth that is in a range of about 10 Kilobits per second (K/bs) to about 20 K/bs.

19. The method of claim 12, further comprising:
wherein the two way radio further comprises a receiver system, wherein the receiver system comprises, a receiver, a demodulator, a decoder block, a digital to analog D/A converter block, a video output device and an audio output device;
receiving, by the receiver, a second digitally compressed modulated signal from a second two-way radio;
demodulating, by the demodulator, the second digitally compressed modulated signal;
decompressing, by the decoder block, the second digitally compressed signal comprising a second digitally compressed audio signal, a second digitally compressed video signal, or both the second digitally compressed audio signal and the second digitally compressed video signal;
converting, by the D/A converter block, any of said decompressed digitized signals into analog signals; and outputting the analog signals to the audio output device, the video output device, or both the audio output device and the video output device,
wherein the decoder block comprises a video decoder, an audio decoder, and a demultiplexer coupled to the video decoder and the audio decoder, wherein the video decoder decompresses the second digitally compressed video signal, and wherein the audio decoder decompresses the second digitally compressed audio signal, the method further comprising:
switching by a second switching means for switching the second digitally compressed audio signal to the audio decoder, the second digitally compressed video signal to the video decoder, or both the second digitally compressed audio signal to the audio decoder and the second digitally compressed video signal to the video decoder, the second switching means including multiple inputs to receive one or both of the second digitally compressed audio signal and the second digitally compressed video signal, the second switching means including multiple outputs connected to the video decoder and the audio decoder to transmit one or both of the second digitally compressed audio signal and the second digitally compressed video signal to the video decoder and the audio decoder.

20. The method of claim 19, the decoder block comprises a hardware decoder block.

21. The method of claim 19, the decoder block comprises a software decoder block.

22. The method of claim 19, wherein the video output device comprises a monitor, and wherein audio output device comprises an amplifier and a speaker.

23. The method of claim 19, further comprising receiving the second digitally compressed modulated signal over a service selected from the group consisting of Family Radio Service (FRS) and General Mobile Radio Service (GMRS).

24. The method of claim 19, wherein the second digitally compressed signal is compressed using a digital compression standard selected from the group consisting of Moving Pictures Experts Group-4 (MPEG-4).

25. The method of claim 19, further comprising receiving the second digitally compressed signal in a bandwidth that is in a range of about 10 Kilobits per second (K/bs) to about 20 K/bs.

* * * * *